May 19, 1970     D. R. STERN ET AL     3,512,219
INJECTION REACTOR FOR TITANIUM DIOXIDE PRODUCTION Filed Oct. 19, 1965     5 Sheets-Sheet 1

FIG-1

INVENTORS.
D. R. STERN
R. M. GUNDZIK
P. M. JONES
P. J. LYNSKEY
BY
ATTORNEY.

May 19, 1970

D. R. STERN ET AL 3,512,219

INJECTION REACTOR FOR TITANIUM DIOXIDE PRODUCTION

Filed Oct. 19, 1965

INVENTORS.
D. R. STERN
R. M. GUNDZIK
P. M. JONES
P. J. LYNSKEY

BY

ATTORNEY.

INVENTORS.
D. R. STERN
R. M. GUNDZIK
P. M. JONES
P. J. LYNSKEY

BY
ATTORNEY.

Patented May 19, 1970

3,512,219
INJECTION REACTOR FOR TITANIUM
DIOXIDE PRODUCTION
David R. Stern, Fullerton, and Richard M. Gundzik,
Hacienda Heights, Calif., and Peter M. Jones, Grimsby,
and Peter J. Lynskey, Laceby, England, assignors of
one-half to American Potash & Chemical Corporation,
Los Angeles, Calif., and one-half to Laporte Industries
Limited, London, England
Filed Oct. 19, 1965, Ser. No. 497,896
Int. Cl. C01g 23/04
U.S. Cl. 23—277                                    14 Claims

ABSTRACT OF THE DISCLOSURE

An apparatus adapted for use in the production of titanium dioxide by the vapor phase oxidation of titanium tetrachloride. The apparatus comprises a reaction zone having an entrance portion, conduit means for introducing an oxidizing gas into the reaction zone and inlet means for introducing titanium tetrachloride vapors into the reaction zone. The downstream end of the conduit means is spaced from the entrance portion of the reaction zone to define a circumferentially extending inlet which comprises the inlet means for the titanium tetrachloride. One or both of the upstream and downstream faces of the inlet means are positioned at an angle to the axis of the reaction zone. The conduit means is constructed in such a manner as to provide an established flow of the oxidizing gas in the conduit means.

---

The present invention relates to processes and apparatus for the commercial manufacture of titanium dioxide.

Previously, it has been proposed to manufacture titanium dioxde by reacting titanium tetrachloride with an oxidizing gas in the vapor phase. That reaction has been carried out either in a reactor of the so-called burner type or in a reactor utilizing a fluidized bed of inert particles. The tendency of product titanium dioxide to form hard deposits within the reactor constitutes a serious difficulty in both types of reactors. When a fluidized bed reactor is used, the deposits are mainly in the form of a coating on the particles that make up the bed. With a burner-type reactor, on the other hand, the deposits are on the walls of the reactor itself, especially in the region of reactant inlets. These deposits can lead to the blockage of the reactor or reactant inlets.

The present invention is based upon the discovery that, when using a burner-type reactor, the deposition of product titanium dioxide on the walls of the reactor can be eliminated or at least substantially reduced by suitable control of the gas-flow within the reaction zone, together with certain other expedients.

Broadly, this invention provides a process for the manufacture of titanium dioxide by reacting titanium tetrachloride with an oxidizing gas in the vapor phase. More specifically, it comprises separately preheating titanium tetrachloride and an oxidizing gas to such a degree that if no reaction were to take place between them, the temperature of the gaseous mixture, hereafter called the "calculated mixed gas temperature," would be at least 800° C. It being understood, of course, that in calculating the mixed gas temperature one should allow for any reaction which may take place between the oxidizing gas and any other substances that may be introduced into the reaction zone.

The preheated oxidizing gas is introduced into the open entrance end of an elongated reaction zone by passing it at a velocity of at least 50 feet per second through a supply conduit. Said conduit has a diameter at its downstream end no greater than the diameter of the entrance end of the reaction zone. The downstream end portion of the conduit over a length equal to at least five times the diameter of the conduit at its downstream end has a straight axis, is coaxial with the reaction zone and is substantially non-divergent in the direction of flow of the oxidizing gas. The downstream end of said conduit is separated in an axial direction from the entrance end of the reaction zone to form a circumferentially extending inlet for the preheated titanium tetrachloride vapor.

The upstream and downstream faces of said inlet extend towards the axis of said conduit and reaction zone at an angle within the range of from 15° to 165° with respect to said axis. In those instances in which the faces are parallel and particularly where the faces extend towards the axis of the reaction zone at an angle greater than 80° with respect to said axis the supply conduit terminates in a tapered section.

In those instances in which the inlet faces converge it is desirable to have the supply conduit terminate in a tapered section.

In those instances in which the titanium tetrachloride vapor issues from the inlet in an upstream direction the supply conduit also terminates in a tapered section.

Preferably, the upstream face extends in a downstream direction towards the axis of the reaction zone at an angle within the range of from about 15° to 80° with respect to said axis. The downstream face extends towards said axis in such manner that the angle between it and the normal to the axis is always at least 10° less than the angle between the upstream face and the normal to the axis.

Particularly satisfactory results are obtained when the upstream face of the inlet extends in a downstream direction towards the axis of the reaction zone at an angle within the range of about 15° to 80° with respect to said axis and the downstream face of said inlet extends towards said axis at an angle within the range of from about 25° to 90° with respect to said axis. Preferably, the angle between the two faces is at least 15°.

Said faces define the inlet to the reaction zone for the titanium tetrachloride vapor. The vapor is passed through this inlet at a velocity of at least 50 feet per second. The rate of flow of vapor is maintained substantially constant along the circumferential extent of the inlet.

The reaction zone preferably has a frusto-conical entrance portion tapering in an upstream direction at an angle of from 1° to 30° and a length equal to about 1 to 25 times its diameter at its entrance end. The reaction zone preferably is cooled to such an extent that the surface of the reaction zone is maintained at a temperature not exceeding 900° C. As will be described more fully hereinafter, an inert particulate refractory material preferably is introduced into the supply conduit for the oxidizing gas. Product titanium dioxide produced in the reaction zone is cooled and separated and recovered from admixture with gases and any inert particulate material.

The invention also provides apparatus for use in the vapor-phase oxidation of titanium tetrachloride comprising an elongated titanium dioxide-forming reaction zone provided with means adapted for the introduction of a pre-heated oxidizing gas, inlet means adapted for the introduction of pre-heated titanium tetrachloride, and an entrance portion. Said means adapted for the introduction of said pre-heated oxidizing gas comprises a supply conduit which has a diameter at its downstream end no greater than the diameter of the entrance of said reaction zone. The downstream end portion of the conduit over a length equal to at least five times the diameter of its downstream end having a straight axis, being coaxial with the reaction zone, and being substantially non-divergent in the direction of flow of the oxidizing gas. The exit end of said conduit is separated in an axial direction from the entrance end of the reaction zone to form said inlet means.

The upstream and downstream faces of said inlet means extend towards the axis of said conduit and reaction zone at an angle within the range of from 15° to 165° with respect to said axis. In those instances in which the faces are parallel and particularly where the faces extend towards the axis of the reaction zone at an angle greater than 80° with respect to said axis the supply conduit terminates in a tapered section.

In those instances in which the inlet faces converge it is desirable to provide the supply conduit with a tapered end section.

Preferably, the upstream face extends in a downstream direction towards the axis of the reaction zone at an angle within the range of from about 15° to 80° with respect to said axis. The downstream face extends towards said axis in such manner that the angle between it and the normal to the axis is always at least 10° less than the angle between the upstream face and the normal to said axis.

Particularly satisfactory results are obtained when the upstream face of the inlet extends in a downstream direction towards the axis of the reaction zone at an angle within the range of about 15° to 80° with respect to said axis and the downstream face of said inlet extends towards said axis at an angle within the range of from about 25° to 90° with respect to said axis. Preferably, the angle between the two faces is at least 15°.

Said faces define the inlet to the reaction zone for said titanium tetrachloride vapor. Means is provided for passing said vapor through said inlet at a velocity of at least 50 feet per second. The rate of flow of vapor is maintained substantially constant along the circumferential extent of the inlet.

The reaction zone preferably has a frusto-conical entrance portion tapering in an upstream direction at an angle of from 1° to 30° and a length equal to about 1 to 25 times its diameter at its entrance end. The reaction zone preferably is provided with means to cool its surface to a temperature not exceeding 900° C. Means for introducing an inert particulate refractory material preferably is provided.

In practicing the invention, in accordance with one aspect thereof, the reactants (including any inert constituents which may be present in the oxidizing gas) are separately pre-heated in such manner that when they are combined in the reaction zone the calculated mixed gas temperature is within the range of from about 800° C. to about 1100° C. and preferably within the range of from about 900° C. to about 1050° C. The pre-heat temperatures required to produce a given calculated mixed gas temperature depend in part on the quantities, temperature and nature of other materials that may be introduced into the reaction zone, as described more fully hereinbelow.

The oxidizing gas may be pre-heated directly by incorporating with it a hot gaseous combustion product obtained by burning a combustible gas such as acetylene, carbon monoxide or the like. If desired each of the reactants may be pre-heated indirectly using heat exchangers. If desired, the oxidizing gas may be pre-heated both directly and indirectly.

The pre-heated oxidizing gas is fed to a supply conduit for introduction into the reaction zone. The downstream end portion of that conduit may be cylindrical with a diameter equal to or slightly less than the diameter of the reaction zone at its upstream end. If desired, said downstream end portion may terminate in a short tapering (preferably, frusto-conical) section, the taper being in a downstream direction. In this latter modification, the diameter of the downstream end of the tapering section should be equal to or slightly less than the diameter of the upstream end of the reaction zone; the remainder or upstream portion of the conduit may be cylindrical and may have a diameter greater than that of the entrance of the reaction zone.

The length of said portion of the supply conduit should have a length equal to at least 5 times, and preferably at least 10 times, its diameter at its exit end. The pre-heated oxidizing gas preferably is introduced into the conduit by first feeding it to an annular distributing chamber surrounding and communicating with a circumferentially extending opening formed in the wall of the conduit.

The oxidizing gas should be introduced in such manner that it leaves the conduit at a velocity of at least 50 feet per second and preferably at least 125 feet per second.

Although preferably continuous, the inlet may be discontinuous being made up of a plurality of shorter inlets. If discontinuous, the breaks in the inlet may serve to join the supply conduit for the oxidizing gas to the entrance end of the reaction zone whereby the conduit and reaction zone may be formed from a single tubular member.

Preferably the titanium tetrachloride should leave the mouth of said inlet at a velocity of at least 50 feet per second. The said velocity may be determined readily from a determination of the volume of titanium tetrachloride flowing through the inlet in unit time and the dimensions of the inlet.

A distributing chamber, to which the pre-heated titanium tetrachloride is fed, is provided to surround the said inlet. The chamber assists in achieving the required uniformity, along the length of the inlet, of the rate of flow of titanium tetrachloride through the inlet by providing a flow path of relatively large cross-sectional area along the length of, but outside, the inlet. The other requirement for achieving the said required uniformity is a sufficient pressure drop across the inlet itself. The inlet should be of uniform width. The distributing chamber should provide a flow path of sufficiently large cross-sectional area to give only a small pressure drop along the said flow path. The flow pattern within the supply conduit for the oxidizing gas and the reaction chamber in the region of the inlet should be such that the pressure is substantially uniform around the circumference of the reaction chamber. The pressure drop across the inlet should be equivalent to from about 5 to about 100, preferably from about 15 to about 75 inches of water.

The reaction zone or chamber preferably is tubular in form, having an entrance portion, i.e., at least that portion which is immediately adjacent to said titanium tetrachloride inlet, preferably frusto-conical, tapering in an upstream direction. The angle of the cone thus defined lies within the range of from 1° to 30° and preferably within the range of from 2° to 15°. Preferably, the length of the tapered or cone portion is within the range of from about 1 to 25 times the diameter of the interior of the reaction zone at its upstream or entrance end.

It is believed that the frusto-conical portion of the reaction zone causes the flowing gases to separate from the surface of the reaction zone with consequent back-mixing of the reactants.

Further, the frusto-conical portion appears to serve as a flameholder and tends to stabilize the titanium dioxide-forming reaction by causing hot gases, together with small particles or fines of product, to be recycled to the region of the titanium tetrachloride inlet.

It is believed that two mechanisms take place in the formation of titanium dioxide. The first mechanism is an entirely gas-phase, or homogeneous, reaction. The second mechanism involves a heterogeneous reaction that takes place on the surface of titanium dioxide nuclei. The relative rates of these reactions determine both the mean particle size and the particle size distribution of the product. As the second mechanism is much the faster of the two, it accounts for most of the particle growth. Recirculation of fine particles to the region of the titanium tetrachloride inlet insures that an adequate surface area of titanium dioxide nuclei is available in that region. This tends to give a narrow particle size distribution. Moreover, the vortex-like action which results appears to act somewhat like a classifier resulting in a more uniform and narrow particle size distribution.

It also has been found that the provision of a frustoconical entrance portion in the reaction zone, as described, tends to increase the proportion of the product titanium dioxide that is produced in the rutile form.

The reason or technical explanation as to why the process and apparatus of the present invention avoid or substantially reduce the build-up of hard deposits on the walls of the reactor and associated equipment is not fully understood at the present time. Without restricting the invention to any particular theories, it is believed that the following factors contribute to the success of the invention:

(1) Passing the oxidizing gas through the supply conduit at velocity of at least 50 feet per second tends to prevent titanium tetrachloride or titanium dioxide product from diffusing or otherwise passing upstream and depositing in or on that conduit.

(2) The unique design of the supply conduit for the oxidizing gas insures that established flow of that gas is established before the gas reaches the circumferential titanium tetrachloride inlet. The term "established flow" as used herein will be understood to mean that kind of flow in which the profiles of the time average of the gas velocity over all cross-sections of the flowpath, perpendicular to the axis of the flow path, are substantially identical and in which the time average of the velocity nowhere has a component parallel to the axis of the conduit in the upstream direction. Such flow of the oxidizing gas through the conduit also tends to prevent titanium tetrachloride vapor from entering that conduit and reacting therein with the oxidizing gas.

(3) The established flow of the oxidizing gas also insures that there are no stagnant regions in which build-up of titanium dioxide deposits could occur.

(4) When the faces of the titanium tetrachloride inlet cause the titanium tetraclloride vapor to enter the reaction zone with a component of velocity which is parallel to the axis of the reaction zone and in a direction downstream thereof, this helps to prevent titanium tetrachloride vapor from entering the supply conduit for the oxidizing gas and reacting therein.

(5) Any downstream component of velocity of the titanium tetrachloride vapor leads to a reduction, for a given velocity through its inlet, of the component of velocity transverse to the axis of the reaction zone and, in turn, reduces the tendency of the titanium tetrachloride stream to constrict the stream of oxidizing gas. As a result, a relatively high gas velocity obtains over substantially the whole of the cross-section of the reaction zone from a thin boundary layer. This is to be contrasted with prior proposals for confining the reactant gas stream in a region away from the surface of the reaction zone.

(6) In this instances in which the circumferential inlet for the titanium tetrachloride converges towards the axis of the reaction zone, eddies are prevented from forming within that inlet and the possibility of the oxidizing gas entering the same is lessened.

(7) The flow velocity of the titanium tetrachloride vapor at the mouth of its inlet is such as to further reduce the possibility of the oxidizing gas entering that inlet.

(8) Maintenance of a substantially constant rate of flow of the titanium tetrachloride vapor along the complete circumferential extent of its inlet avoids the possibility that it might deflect the stream of oxidizing gas towards one side of the reaction zone, with a consequent reduction in gas velocity on the other side of the zone.

To provide additional heat in the region where the vaporous reactants meet, i.e., in addition to that imparted to the reactants in their separate pre-heaters, and to provide more accurate and flexible control of the mixed gas temperature, a combustible gas such as carbon monoxide, benzene, naphthalene, acetylene, anthracene, and the like can be introduced into the reaction zone or into the downstream end portion of the supply conduit for the oxidizing gas. Such gas preferably is introduced at such a rate as to raise the calculated mixed gas temperature by an amount within the range of from about 5° C. to about 200° C.

Thus, it will be appreciated that, within the above limits, a combustible gas may be added in quantities sufficient to provide enough added heat to attain any desired mixed gas temperature and thereby correspondingly reduce the load on the reactant preheaters.

The combustible gas preferably should be introduced into the supply conduit for the oxidizing gas at such a point that substantially all the heat release that occurs as a result of the combustion of said gas with the oxidizing gas occurs in the region where the reactants mix and/or in the extreme downstream end portion of the supply conduit for the oxidizing gas. Thus, the combustible gas preferably is introduced into the conduit for the oxidizing gas at a point separated, in an axial direction, from the titanium tetrachloride inlet. Preferably, the distance should not exceed 2 feet or 10 times the internal diameter of the reaction zone at its entrance end, whichever is less.

The capability of varying the calculated mixed gas temperature as little as 20° C. is important commercially because such variation has an appreciable effect on the pigmentary properties of the titanium dioxide product produced. In accordance with one aspect of this invention, therefore, it is possible to change from the production of one grade of titanium dioxide to another, without interrupting the process, by altering the calculated mixed gas temperature through varying the rate of introduction of a combustible gas such as carbon monoxide. Further, small variations in the rate of introduction of the combustible gas may be made in order to compensate for variations in the performance of the pre-heaters and thus maintain the calculated mixed gas temperature substantially constant at any predetermined value. Such small variations may be effected automatically in response, for example, to variations in the temperature of the product gas stream at a point sufficiently far downstream of the titanium tetrachloride inlet for the reaction to be substantially complete, care being taken to insure stability of control. Thus, there may be provided means for controlling the rate of supply of the combustible gas, the control means being adjustable to provide, for a given mean degree of preheat, any of a number of different calculated mixed gas temperatures, for example, temperatures at intervals of 10° C. and to compensate automatically for small departures of the degree of preheat from the aforesaid mean in order to maintain the calculated mixed gas temperature at substantially the required value.

A property of white pigments, especially titanium dioxide pigments, which is becoming increasingly significant in industry is the carbon black undertone value, commonly referred to as C.B.U. value. The C.B.U. value is affected by relatively small variations in the calculated mixed gas temperature, increasing the mixed gas temperature having the effect of lowering the C.B.U. value.

The addition of a given amount of carbon black pigment to white paints containing the same concentrations by weight of white titanium dioxide pigments of the same dry color but of different mean particle diameters results in a range of gray paints with different color tones, the grays ranging from blue-gray for small particle diameters to yellow-gray for large particle diameters. Paints that are tinted with colored pigments are similarly effected.

This effect arises from the difference in the refractive index of titanium dioxide for blue and red light, which leads to the path length of blue light within a film of a titanium dioxide paint being less than the corresponding path length for red light. In the case of white paints, this has little effect, but with gray or tinted paints, where there is appreciable absorption of the light, the difference in path lengths leads to differing degrees of absorption of different colors. The greater path length in the paint film of the red light results in its being more strongly absorbed than the blue light so that the reflectance of the paint film for red light is reduced relatively to the reflectance for blue light.

The magnitude of the difference in path lengths is a function of the mean particle diameter of the titanium dioxide pigment, the difference in path lengths being greater for smaller particle diameters. Thus, the use of a pigment having a small mean particle diameter tends to accentuate the blue tones.

The C.B.U. values referred to herein are obtained by measuring the reflectance for red, blue and green light of samples containing standard amounts of carbon black and the titanium dioxide pigment in question, with reference to a standard white surface, for example, magnesium oxide. The C.B.U. value represents the difference between the reflectance for blue and red light expressed as a percentage of the reflectance for green light.

The C.B.U. value of a given pigment will depend, of course, upon the particular reference surface chosen, on the wave-lengths at which the reflectances are measured, and on the particular method of manufacture of the carbon black. Therefore, different choices of these various factors give rise to different scales of C.B.U. values. It is found, however, that the different scales are in good agreement for practical purposes to within an additive constant. Thus, there is good agreement between the differences in C.B.U. values for two pigments when measured on different scales. The C.B.U. value of a given pigment or a given scale is usually reproducible to within ±0.5 unit. All the C.B.U. values referred to herein are measured on the same scale.

To be commercially acceptable, pigments must have C.B.U. values controlled to within ±1 unit of a given value. Further, because the effect can be used to compensate for the color of the medium in which the pigment is to be used, pigments having different C.B.U. values are produced for different end uses and therefore, in addition to providing accurate control of the C.B.U. value, a process for the manufacture of pigmentary titanium dioxide should preferably be flexible to permit variation of the C.B.U. value of the product.

By the addition of small quantities of a combustible gas in accordance with the procedures herein described accurate control of C.B.U. values and ready change of C.B.U. values now may be achieved readily.

As an example of the manner in which the effect can be used to compensate for the color of a medium, in linoleum the pigment is incorporated in a yellow medium and, by using a pigment having a high negative C.B.U. value (which gives a blue tone), it is possible to obtain a final product that is neutral white in appearance.

Commercial pigments for use in paint generally have C.B.U. values within the range of from −1 to −5 units. C.B.U. values towards the negative end of this range, that is to say, from −3 to −5 units, correspond to the particle size range that scatters light most efficiently and thus to pigments of high opacity. Pigments having C.B.U. values of −6 or below are generally used in floor coverings and in paper and plastics. For C.B.U. values below −5 or −6, there is a progressive decrease in hiding power because some of the pigment particles become too small to contribute appreciably to the scattering of light in the visible part of the spectrum.

Therefore, in accordance with this aspect of the present invention, a convenient and readily controllable process is provided for quickly varying the calculated mixed gas temperatures in titanium dioxide-producing systems. The process comprises, initially, separately pre-heating titanium tetrachloride and an oxidizing gas in such manner that when they are combined in an elongated titanium dioxide forming reaction zone, they have a calculated mixed gas temperature of at least 800° C. The pre-heated oxidizing gas and the pre-heated titanium tetrachloride are introduced into the reaction zone through separate means. Combustible gas is introduced at a rate sufficient to raise the mixed gas temperature from about 5° C. to 200° C.

The apparatus of the present invention including the walls of the reaction zone, the supply conduit for the oxidizing gas and the means for supplying the titanium tetrachloride to the inlet for that reactant, may be constructed of the same or different materials. Broadly, the choice lies between corrosion-resistant metals, for example, stainless steels or nickel alloys on the one hand and non-metallic refractory materials, for example, quartz, fused silica, alumina or the like on the other hand.

The use of metals has the advantage that parts can be fabricated more easily therefrom than from a non-metallic refractory material and they are more robust and durable. On the other hand, most metal surfaces exposed to titanium tetrachloride vapor or to the chlorine that is produced by the reaction must be cooled to a relatively low temperature to prevent corrosion thereof. The fact that such cooling is not required to prevent corrosion when non-metallic refractory materials are used constitutes the principal advantage of using the latter materials.

Cooling the surface of the reaction zone has a further beneficial effect in reducing the tendency of titanium dioxide deposits to build-up thereon. If the surface of the reaction zone is cooled to too low a temperature, however, the reaction may be extinguished, especially when the diameter of the reaction chamber is small, say, less than 2 inches, and when, as is described hereinafter, the oxidizing gas consists, not of pure oxygen, but of oxygen together with a diluent gas or gases, for example, when the oxidizing gas consists of air.

In the case of the supply conduit for the oxidizing gas and the means for supplying the titanium tetrachloride to its inlet, cooling is disadvantageous, because it increases the degree of pre-heat that is required to achieve the required calculated mixed gas temperature.

In view of these considerations, three of the various possible arrangements are of special interest.

First, the reaction zone may be constructed of metal and the supply conduit for the oxidizing gas and the supply means for the titanium tetrachloride may be constructed of non-metallic refractory materials. This arrangement has the advantages of providing a robust and easily cooled reaction zone while at the same time avoiding the need to cool surfaces upstream of the reaction zone. Such an arrangement, including a suitable form of joint between the metallic and non-metallic portions, is described in co-pending application Ser. No. 318,337, filed Nov. 5, 1962, now abandoned.

Secondly, the entire apparatus may be constructed of a non-metallic refractory material. This has the advantage of avoiding completely the need for any cooling except for the relatively small amount required to maintain the surface of the reaction zone at a temperature not exceeding 900° C. To lessen the risk of fractures occurring, especially when the apparatus is being heated up or cooled down, the reaction zone, the supply conduit for the oxidizing gas and the means for supplying the titanium tetrachloride to its inlet are of integral construction, thereby avoiding the need for providing welds between the aforesaid parts. A reactor having such integral construction is disclosed in co-pending application Ser. No. 367,057, filed June 10, 1963, now U.S. Pat. No. 3,297,411 to William N. Dear.

Thirdly, the entire reactor may be constructed of metal. This arrangement has the important advantage that the apparatus is considerably more durable and robust than when some or all of it is constructed of a non-metallic material. Moreover, it avoids the need for joints between metallic and non-metallic parts, except possibly between the supply conduit for the oxidizing gas and the supply means for the titanium tetrachloride on the one hand and non-metallic pre-heaters on the other hand. Further, the use of metal greatly facilitates the fabrication of the various parts to the necessary accuracy.

It has been found that, when the entire apparatus is constructed of metal, it is possible by the use of certain expedients to reduce considerably the extent to which cooling must be employed upstream of the reaction zone. The need for cooling both the supply conduit for the oxidizing gas and the means for supplying the titanium tetrachloride can either be eliminated entirely or reduced considerably, as compared with what has previously been thought to be necessary, depending upon a proper choice of materials of construction.

Thus, in accordance with one preferred embodiment of this invention, the entire apparatus is made of metal. In such apparatus, the supply conduit for the oxidizing gas is constructed of a metal that is resistant to corrosion by the oxidizing gas up to its pre-heat temperature of about 800° C.–1000° C. This eliminates the necessity for cooling the surface of said supply conduit. At least a part of the inner surface of the distributing chamber disposed about the titanium tetrachloride inlet and that inlet itself are formed of platinum or an alloy thereof that is resistant to corrosion by titanium tetrachloride at the temperature to which it has been pre-heated. If desired, any part of said inner surface of the distributing chamber or of the inlet may be formed of a metal other than platinum or an alloy thereof, however, in such instance such parts should be provided with means for cooling the same to a temperature below that at which corrosion thereof by titanium tetrachloride would occur. Such temperature can be achieved, for example, by flowing a coolant fluid about said surfaces and out of contact with the reactants. Preferably, of course, the parts of the entire inner surface of the distributing chamber and the titanium tetrachloride inlet are formed of platinum or a corrosion-resistant alloy thereof, except for example, those parts whose inner surface comprise the outer surface of the cooling jacket of the reaction zone, i.e., the downstream face of the inlet.

In the case of the embodiment just described, it now is possible to dispense with means for cooling all surfaces of the apparatus which are upstream from the titanium tetrachloride inlet. Formerly, it was believed necessary to cool such surfaces for two reasons. First, to prevent corrosive attack thereof by the titanium tetrachloride reactant and by the chlorine produced in the reaction. Secondly, to prevent undesired build-up of titanium dioxide product on such wall surfaces. The present invention overcomes these problems. Thus, in accordance herewith, the velocity of the introduction of the oxidizing gas, the form of the flow path of the oxidizing gas to the reaction zone and the velocity of introduction and uniform distribution of the titanium tetrachloride insure that substantially no titanium dioxide is formed within or enters the region upstream of the titanium tetrachloride inlet, i.e., either within the supply conduit for the oxidizing gas or the annular distribution chamber for the titanium tetrachloride. It now is possible, therefore, to avoid cooling of the apparatus upstream of that inlet in order to prevent the formation of hard deposits of titanium dioxide. Moreover, the corrosion problem is overcome through the utilization of platinum or corrosive-resistant alloys thereof.

When platinum is used, it preferably is applied as a lining to another metal, for example, a suitable steel or other metal alloy, having the necessary strength at the relevant temperatures and a coefficient of thermal expansion not too dissimilar from that of platinum. The platinum lining may be secured to the supporting metal in any suitable manner. Certain corrosion-resistant alloys of platinum, on the other hand, have sufficient structural strength to enable them to be used without any backing.

Any part of the apparatus that is constructed of metal and that comes in contact with one or both reactants or with the product gas stream must, of course, be resistant to attack at the temperature involved. Thus, the choice of metal for the construction of any such part depends upon the operating temperature of such part. At very high temperatures, platinum or an alloy thereof must be used, at temperatures of from 300° C. to 500° C. for parts exposed to titanium tetrachloride or chlorine and at temperatures of from 800° C. to 1,050° C. for parts exposed to oxygen, stainless steels or, preferably, nickel or nickel alloys, for example, Inconel, may be used.

If any part of the reactor is to be constructed of a non-metallic refractory material, it is preferred to use quartz, fused silica or alumina. Of these materials, alumina has certain advantages over quartz or fused silica for parts exposed to very high temperatures. On the other hand, parts of complicated shape often are more easily fabricated in quartz or fused silica.

When the walls of the reaction zone and the supply conduit for the oxidizing gas are constructed of metal they may be rigidly secured together, for example, by means of bolts passing through flanges. Further, when the titanium tetrachloride inlet is discontinuous, the downstream end portion of the wall of the supply conduit for the oxidizing gas may be integral with the upstream end portion of the reaction zone wall.

When the reaction zone wall is constructed of a non-metallic refractory material, it is preferred to cool the surface of the reaction zone to a temperature not exceeding 800° C. and, preferably to a temperature not exceeding 650° C.

The coolant fluid used to cool reaction zones constructed of a non-metallic refractory metal include gases, for example, air; a molten metal, for example, sodium, mercury or lead; or a molten metal salt or a molten mixture of metal salts, for example, a mixture consisting of 40% sodium nitrite, 7% sodium nitrate and 53% potassium nitrate, by weight. When the coolant fluid is a gas, such as air, the reaction zone should be provided with a double-walled cooling jacket constructed of metal. The air is fed between the inner wall of the cooling jacket and the outer surface of the reaction zone wall. A coolant liquid such as oil, a molten metal, a molten mixture of metal salts, water or the like is fed between the inner and outer walls of the cooling jacket.

The coolant fluid used to cool any part of the reactor that is constructed of metal may be air, water steam, oil, a molten metal, for example, sodium, mercury or lead, or a molten metal salt or a molten mixture of metal salts, for example, a mixture consisting of 40% sodium nitrite, 7% sodium nitrate and 53% potassium nitrate, by weight.

If desired, the wall of the reaction zone and/or the wall of the supply conduit for the oxidizing gas may be porous and the inner surfaces of these walls may be cooled by causing a coolant gas to diffuse through them into the interior of the apparatus. In addition to cooling the inner surfaces of these walls, the gas also serves to tend to prevent product titanium dioxide from reaching the said surfaces. The gas so introduced may be a gas that is inert with respect to the reactants and to the reaction products. When it is desired to introduce carbon monoxide into the system for the purpose of raising the calculated mixed gas temperature, as described herein, it is convenient to do the same by diffusing it through the wall of the supply conduit for the oxidizing gas.

If the supply conduit for the oxidizing gas and/or the supply means for the titanium tetrachloride is constructed of metal and the associated pre-heater or pre-heaters are constructed of non-metallic refractory materials, the necessary joints may be of the kind disclosed in co-pending application Ser. No. 290,479, filed July 11, 1962, now U.S. Pat. No. 3,284,163 to William N. Dear.

As indicated hereinabove, inert particulate refractory material, of larger mean particle size than the titanium dioxide product being produced, preferably is introduced in such manner as to impinge upon those surfaces of the reaction zone and the oxygen supply conduit that are adjacent to the titanium tetrachloride inlet to prevent or substantially reduce any tendency for the deposition of titanium dioxide on said surfaces. Said material preferably is introduced, in a pre-heated condition and in suspension in a suitable carrier gas, into the supply conduit for the oxidizing gas. The refractory material is substantially completely carried out of the reaction zone and thereafter is separated from the product titanium dioxide.

Preferably, the inert particulate refractory material, together with its carrier gas is introduced into the supply conduit for the oxidizing gas through a nozzle mounted coaxially within said conduit, and exiting in the downstream direction. The nozzle may be constructed from suitable corrosion-resistant metals including, for example, Inconel or Nihard, or from a suitable corrosion-resistant and wear-resistant non-metallic material such as alumina.

When it is desired to introduce both an inert refractory material and a combustible gas as described hereinabove, the refractory material can be introduced through a nozzle situated coaxially within the exit end of the supply conduit for the oxidizing gas and the combustible gas can be introduced through tubes mounted parallel with and in close proximity to that nozzle Such tubes should terminate short of the exit or downstream end of said nozzle. If, as will be described hereinbelow, deflecting means is provided within said supply conduit, the combustible gas can be supplied through a tube mounted coaxially within said deflecting means. It is, of course, important to arrange that the heat released by the burning of the combustible gas does not damage such nozzle or deflecting means.

The inert particulate refractory material may be introduced through nozzles of varying configurations. Thus, the nozzle may be convergent in a downstream direction. Preferably, however, it is in the form of a venturi in which the nozzle is provided with a coaxial, conical member situated a short distance downstream of the mouth of the venturi, the apex of the cone pointing in the upstream direction. The conical member serves to deflect the gaseous suspension outwardly and, preferably, is so mounted as to enable its position to be adjusted in an axial direction to enable the extent of the said deflection to be varied.

Instead of introducing the inert particulate refractory material through a nozzle situated coaxially within the supply conduit for the oxidizing gas, such material may be introduced into the supply conduit at or towards the upstream end thereof or it may be introduced into the pre-heated oxidizing gas before that gas enters the supply conduit. Moreover, deflecting means may be provided within the oxygen supply conduit and arranged in such manner as to deflect the gaseous suspension of particulate material towards the surface of the said supply conduit. Such deflecting means may comprise a rifled or helically vaned member mounted coaxially within the said supply conduit. Alternatively, it may comprise a coaxially mounted member whose diameter first increases and then decreases in a downstream direction whereby the region between such member and the surface of the supply conduit forms what can be regarded as an annular venturi. It will be understood, of course, that one or more nozzles may be used, as desired.

The inert particulate refractory material must be a hard solid that is not attacked to any appreciable degree by chlorine at the temperatures and under the other conditions that obtain during the titanium dioxide-forming reaction. The material may comprise zircon particles, alumina particles, titanium dioxide particles or the like. Preferably, the material is silica sand. The material may also be a mixture of two or more of these materials. The particles should not be so small as to pass through an 85 mesh screen (B.S.S.). The practical upper limit of the particle size is determined in general by the requirement that the particulate refractory material shall be carried out of the reaction chamber by the gas stream. Preferably, substantially all the particles should have a size within the range of from −10 to +40 mesh (B.S.S.).

The optimum rate of introduction of the inert particulate refractory material depends upon the design and dimensions of the reactor and may be varied during the operation of the process. If the rate of introduction is high, the quantity of the material to be separated from the product titanium dioxide will be correspondingly large. If the material is introduced into the reaction chamber at too low a temperature, undue cooling of the reactants will occur with consequent incomplete reaction. Therefore, it is desirable that the particulate material be preheated to an elevated temperature prior to its introduction into the oxygen supply conduit.

The inert particulate refractory material should be introduced into the supply conduit for the oxidizing gas at a velocity of at least about 20 feet per second, preferably at a velocity of about 50–100 feet per second. The upper limit for the velocity of introduction of the inert particulate refractory material is determined by the requirement that it should not be so high as to cause undue wear of the reactor surface or surfaces. Generally, to avoid undue wear of such surfaces as well as the internal surface of the nozzle through which it may be introduced, the velocity of introduction should not exceed about 175 feet per second, and preferably should not exceed 120 feet per second.

The carrier gas in which the refractory material is suspended may be a gas that is inert to the reactants under the conditions of the reaction, and may include, for example, chlorine, nitrogen or the like. Of the inert gases, chlorine is preferred, since it does not reduce the concentration of chlorine in the product gas stream which advantageously can be used in the chlorination operation.

When a small reaction zone is used, for example, one having an internal diameter not exceeding four inches at the titanium tetrachloride inlet, the gas is advantageously an oxidizing gas, preferably, oxygen.

The concentration of the particulate refractory material in its carrier gas should be high, for example, about 0.1 to 1.0 pound of material per cubic foot of gas, measured at the pressure of introduction of the gas into the reaction zone.

Product titanium dioxide may be separated from the inert particulate refractory material by means of settling chambers. However, cyclones may be used either instead of or in conjunction with such settling chambers. After the refractory material has been separated from the product titanium dioxide, it preferably is cooled and thereafter recycled to the reactor.

It is important that the design of the apparatus, the temperatures and the reactant flow rates be such that the reactants and the products of the reaction remain within the reaction zone for a period of time sufficient to insure substantially complete reaction, but not so long as to cause undesirable particle growth of the product oxide. Usually, a retention time within the range of from about 0.02 to about 10 seconds is satisfactory. When the oxidizing gas is pure oxygen or oxygen-enriched air, however, the retention time can, under suitable conditions, be as low as 0.01 second.

After the gaseous products, with the product titanium dioxide in suspension therein leave the reaction zone they preferably are cooled rapidly to reduce their temperature to below about 900° C., preferably below about 650° C. Such cooling may take place at a time within the range of from about 0.01 to about 10 seconds, preferably about 0.05 to about 5 seconds after the titanium tetrachloride is introduced into the reaction zone. The cooling may be effected by mixing cooled product gas, for example, chlorine, with the product gas stream containing the product oxide in suspension. Another method of cooling is to pass the products into water in accordance with the procedure disclosed in U.S. application Ser. No. 389,423, filed Aug. 13, 1964, now U.S. Pat. No. 3,310,377 to D. R. Stern and R. M. Gunzik.

The separation of product titanium dioxide from the inert particulate refractory material and the cooling of the reaction products may be carried out in a single operation in accordance with the procedure disclosed in copending application Ser. No. 427,688, filed Jan. 29, 1964, now U.S. Pat. No. 3,341,014 to Maurice A. Claridge, Peter M. Jones and Raymond J. Wigginton.

The oxidizing gas preferably comprises molecular oxygen and it may consist of substantially pure oxygen or of oxygen in admixture with an inert gas or gases, for example, air or oxygen-enriched air. One effect of using air or oxygen-enriched air instead of substantially pure oxygen as the oxidizing gas is a tendency for the production of titanium dioxide having a smaller particle size. The choice of the oxidizing gas depends to some extent upon the diameter of the reaction zone. Other relevant factors include the degree to which the reactants are pre-heated and the temperature to which the surface of the reaction zone is cooled and the throughput rate of the reactants. The proportion of oxygen in the oxidizing gas is one of the factors that determines the maximum temperature reached by the gaseous mixture in the reaction zone, the temperature distribution along the length of the reaction zone and the particle size of the product titanium dioxide. An increase in the proportion of oxygen tends to result in an increase in the maximum temperature, in the temperature falling off less quickly along the length of the reaction zone and effects the particle size of the product titanium dioxide. When the reaction zone is small, there is a risk that the reaction will be prematurely extinguished if the oxidizing gas is air because of high heat losses. It then is necessary to use an oxidizing gas containing a higher proportion of oxygen, for example, oxygen-enriched or substantially pure oxygen. The risk of prematurely extinguishing the reaction is greater when the temperature to which the surface of the reaction zone is cooled is lower, but this factor is usually less important than the size of the zone and the reactant throughput rate.

In the case of reaction zones of greater size the ratio of the volume of the reaction zone to the area of the inner surface that is cooled is larger, and it may therefore be possible to use air as the oxidizing gas without the risk that the reaction will be prematurely extinguished.

The amount of oxidizing gas introduced into the reaction zone may vary within the range of about 90% to about 125% of the amount required for stoichiometric reaction with the titanium tetrachloride. In certain instances a slight excess, for example, about 5% to 10% excess may be preferred.

In addition to the quantity of oxidizing gas introduced for reaction with the titanium tetrachloride, it also is necessary to introduce sufficient oxidizing gas for stoichiometric reaction with any combustible gas such as carbon monoxide or the like and with any additives, as described hereinafter, that may be introduced into the reaction zone. It is necessary to introduce such an additional amount of oxidizing gas notwithstanding the fact that the rate as specified above may be in excess of the rate required for stoichiometric reaction with the titanium tetrachloride. In determining a suitable rate of introduction of the oxidizing gas, both the rate of introduction of the pre-heated oxidizing gas and of any oxidizing gas introduced into the reaction zone as a carrier gas for the inert particulate refractory material must be included.

Satisfactory results are obtained if there is introduced into the reaction zone a quantity of water vapor within the range of from 0.00005 to 0.025 parts, preferably 0.0005 to 0.005 parts, per part of titanium tetrachloride vapor introduced into the reaction zone (the parts being by weight). The water vapor can be introduced into the oxidization zone in admixture with the oxidizing gas. When the oxidizing gas is atmospheric air, it may be found that the air contains sufficient moisture so that no additional water need be added. If the air is to be scrubbed to remove gaseous impurities, it is possible to leave the quantity of water vapor contatined in the air unchanged or to increase it by proper scrubbing techniques. If desired, the water vapor may be introduced in admixture with the gas in which the inert particulate refractory material is suspended. As described in copending application Ser. No. 459,995, filed June 1, 1965 by Raymond J. Wigginton, William N Dear and William R. Culfeather, now U.S. Pat. No. 3,414,379, some or all of the water vapor may be incorporated with the oxidizing gas, when the oxidizing gas is pre-heated directly, by using a combustible gas which has water as a combustion product.

Various conditioners and other agents may be introduced into the reaction zone. Thus, for example, aluminum oxide may be formed within the reaction zone and incorporated with the product titanium dioxide to aid in the formation of rutile pigment, to improve other pigmentary properties such as anti-yellowing in stoving finishes, and to render the pigment neutral in reaction after suitable chlorine removal as by degassing at an elevated temperature. The quantity of aluminum oxide added may be within the range of from about 0.2% to 10.0%, preferably from about 0.5% to 4.0% by weight, based on the weight of the titanium dioxide product.

The aluminum oxide is advantageously formed by introducing aluminum chloride vapor into the reaction zone. The vapor may be introduced in admixture with the titanium tetrachloride vapor or directly into either the oxidizing gas supply conduit or into the reaction zone, through separate inlet means. Aluminum chloride vapor can be admixed with the titanium tetrachloride vapor in the pre-heaters or aluminum chloride and liquid titanium tetrachloride may be premixed and then vaporized jointly. The aluminum oxide also may be formed by incorporating powdered aluminum metal with the inert particulate refractory material or by introducing powdered aluminum metal in suspension in the titanium tetrachloride vapor.

Also, silicon tetrachloride may be introduced into the reaction zone in a quantity (calculated as $SiO_2$) within the range of from about 0.05% to 1.0%, preferably from about 0.1% to 0.5% by weight, based on the weight of the product titanium dioxide. The introduction of silicon tetrachloride results in a tendency for the product titanium dioxide to have a small particle size. The silicon tetrachloride may be introduced into the supply conduit for the oxidizing gas or into the reaction zone through separate inlet means. Preferably, it is introduced into the reaction chamber in admixture with the titanium tetrachloride vapor. Titanium oxychloride, finely divided oxides, organic compounds such as hydrocarbons and titanium esters, which act as or provide material for nucleation, may also be introduced into the reaction zone.

For a more complete understanding of the present invention, reference is made to the following description thereof taken in conjunction with the accompanying drawing in which.

Figure 1:
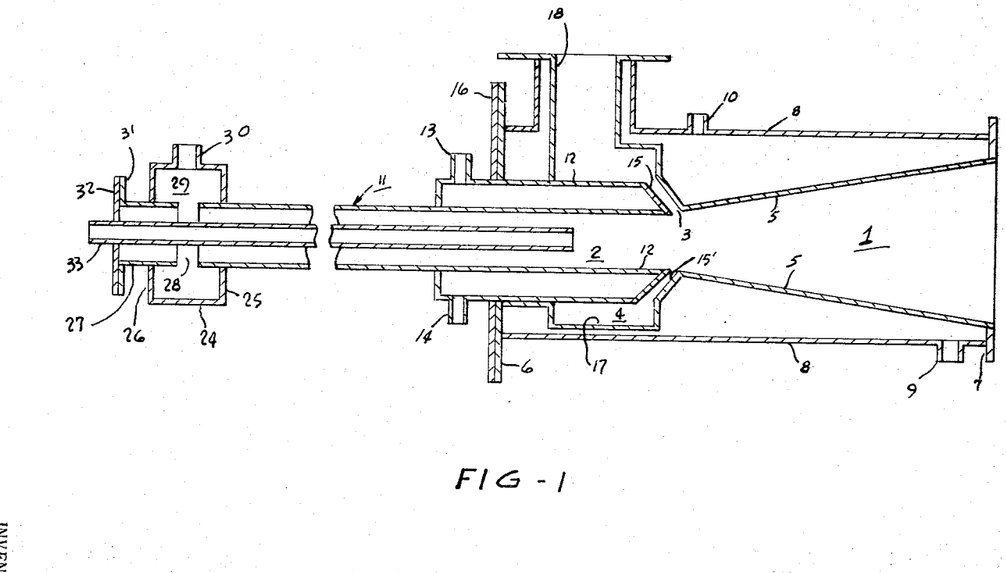
FIG. 1 is a cross-sectional view taken through one form of apparatus.

Referring to FIG. 1 of the accompanying drawing, the first form of apparatus comprises a frusto-conical reaction zone 1 and a cylindrical supply conduit 2 for the preheated oxidizing gas. The conduit 2 is coaxial with the reaction zone 1 and is arranged to supply oxidizing gas to the open end of the reaction zone 1.

The downstream end of the supply conduit 2 is spaced from the upstream end of the reaction zone 1 to form a circumferentially extending inlet 3, which provides communication between the reaction zone 1 and an annular distributing chamber 4, and which serves as an inlet for the pre-heated titanium tetrachloride vapor.

The portion of the reaction zone 1 immediately downstream of the inlet 3 is bounded by a frusto-conical tubular member 5. A cooling jacket 8 surrounds the distributing chamber 4 and the member 5, and it is secured at its upstream end to a flange 6 and at its downstream end to a flange 7. An inlet pipe 9 allows cooling water to be supplied to the cooling jacket 8 close to the downstream end thereof and an outlet pipe 10 allows water to be withdrawn from the cooling jacket 8.

The supply conduit 2 is formed by a cylindrical tubular member, which is indicated generally by the reference numeral 11. The downstream end portion 12 of the member 11 has a double wall to permit liquid cooling of the portion 12, inlet and outlet pipes 13 and 14 for the liquid coolant being provided close to the upstream end of the portion 12. The downstream end face 15 of the member 11, which forms the upstream face of the inlet 3, is inclined in a downstream direction towards the axis of the reaction zone 1. Downstream face 15' which is integral with member 5 also is inclined in a downstream direction towards the axis of the reaction zone 1.

A short distance downstream of the inlet and outlet pipes 13 and 14, the member 12 is formed with an outwardly extending annular flange 16. The flanges 6 and 16 being secured together by bolts, not shown. Tubular member 17 which is coaxial with tubular member 11 and is integral with face 15' of inlet 3 has an upstream end portion of reduced diameter to provide a close fit over the portion 12 of the member 11. The upstream end of the member 17 is secured to the flange 6. Thus, in addition to forming the outer wall of the annular distributing chamber 4, the member 17 serves to locate the tubular member 5 with respect to the tubular member 11.

The member 17 and the cooling jacket 8 are each formed with a cylindrical extension which form a conduit 18 to enable pre-heated titanium tetrachloride vapor to be supplied to the annular distributing chamber 4.

The upstream end portion of the member 11 is surrounded by a tubular cylindrical member 24, which is coaxial with the member 11 and which is formed at its downstream end with an inwardly extending annular flange 25 and at its upstream end with an inwardly extending annular flange 26. At its inner edge, the flange 25 is secured to the member 11. The flange 26 is secured at its inner edge to a short tubular member 27 having the same internal and external diameters as the member 11 and mounted coaxially with the member 11. The downstream end of the member 27 is spaced from the upstream end of the member 11 to form a circumferentially extending slot 28. The slot 28 provides communication between an annular distributing chamber 29, which is bounded by the members 11 and 24 and the flanges 25 and 26. The member 24 is formed with a cylindrical extension 30 which serves as an inlet for the preheated oxidizing gas.

At its upstream end, the tubular member 27 is formed with an outwardly extending annular flange 31 which is secured by bolts (not shown) to a circular plate 32 that is coaxial with the tubular member 11.

The plate 32 is formed with a circular aperture which is coaxial with the member 11 and through which there passes a tube 33. The tube 33 extends coaxially with the member 11 and terminates a short distance upstream of the inlet 3 to enable an inert particulate refractory material to be introduced into the reactor.

The angle of the imaginary cone on which the internal surface of the frusto-conical member 5 lies may be 10°30'. The apparatus ma ybe constructed of a nickel alloy, for example, Inconel.

In operation, the preheated oxidizing gas is supplied to the inlet 30, whence it passes through the annular distributing chamber 29 and the slot 28 into the supply conduit 2 for the oxidizing gas. During the course of its passage down the supply conduit 2, any gross irregularities in the flow pattern of the oxidizing gas disappear and established flow (as hereinbefore defined) is attained before the oxidizing gas reaches the inlet 3.

The pre-heated titanium tetrachloride vapor is supplied to the conduit 18, whence it passes through the annular distributing zone 4 and inlet 3 to enter the reaction zone 1, where it mixes and reacts with the pre-heated oxidizing gas to form finely divided titanium dioxide and, if the oxidizing gas is oxygen, chlorine. The frusto-conical form of the portion of the reaction zone 1 that is immediately downstream of the inlet 3 improves the mixing of the reactants and causes a proportion of the reaction products to be recycled to the vicinity of the inlet 3.

Preheated inert particulate refractory material, for example, silica sand, suspended in a carrier gas, for example, an oxidizing gas, is supplied to the tube 33, the carrier gas being under pressure. This results in a spray of the particulate material issuing from the end of the tube 33 and impinging on the surfaces of the reaction zone 1 and the supply conduit 2 adjacent to the inlet 3. In addition to tending to prevent the build-up of titanium dioxide deposits in the region of the inlet 3, it is believed that the particulate material may assist in the reaction by reason of the dislodging of titanium dioxide particles, by the inert material, whereby they may serve as seeds.

The circulation of a suitable coolant liquid, for example, water through the cooling jackets serves to prevent corrosion of the metal surfaces that are exposed to the reactants or reaction products.

After leaving the reaction chamber 1, the product gas stream is cooled and product titanium dioxide is brought out of suspension and separated from the inert particulate material.

Figure 2:
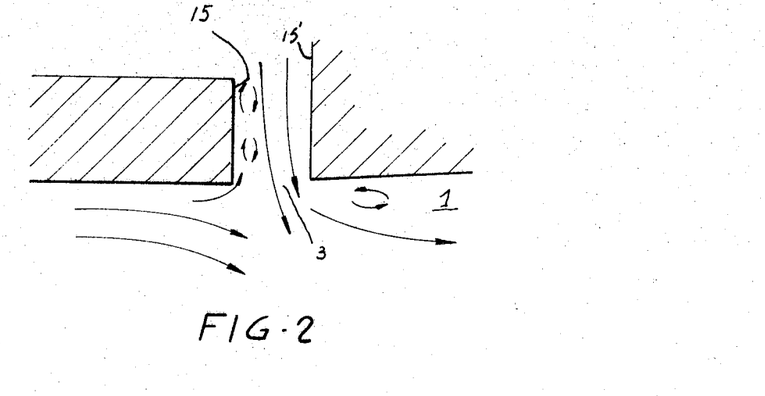
FIGS. 2 and 3 are schematic cross-sectional views taken through a part of the reactor on a larger scale, showing the effect on the flow pattern of varying the configuration of the titanium tetrachloride inlet.
Figure 3:
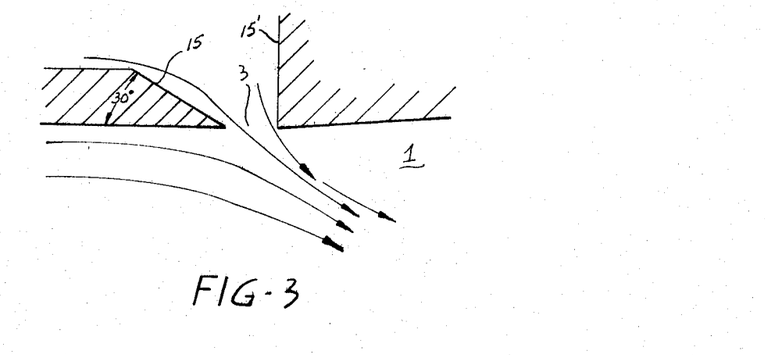

The effect of the inclination of the upstream face 15 of the inlet 3 (while keeping the downstream face 15' at an angle of 90° with respect to the axis of the reaction zone) on the gas flow pattern is shown qualitatively in FIGS. 2 and 3 of the drawings. FIG. 2 shows how, when the upstream face 15 of the inlet 3 extends in a direction towards and at an angle of 90° with respect to the axis of the reaction chamber 1, eddies are liable to form within the inlet 3 and oxidizing gas is liable to enter the inlet with a consequent risk of titanium dioxide being deposited on the faces thereof. There is also a tendency for eddies to form in the reaction zone 1 immediately downstream of the inlet 3 and such eddies increase the tendency for titanium dioxide to be deposited on the surface of that portion of the reaction zone 1.

In FIG. 3, on the other hand, it can be seen how, when the upstream face 15 of the inlet 3 is inclined at an angle of 30° with respect to the axis of the reaction zone 1, the flow separation that causes the eddies to form when the upstream face of the inlet is not so inclined, is avoided.

Figure 4:
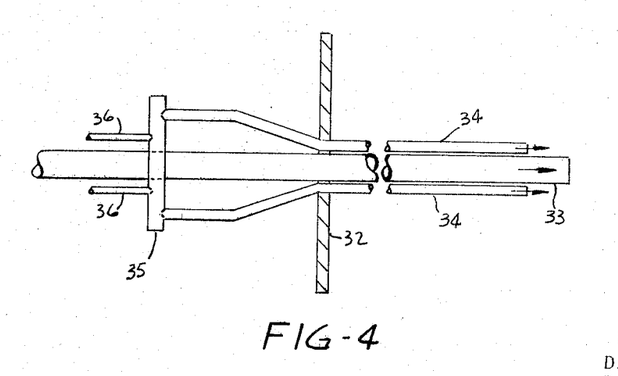
FIG. 4 is a cross-sectional view taken through a part of the form of apparatus shown in FIG. 1 modified by the addition of means for introducing a combustible gas.

The form of apparatus shown in FIG. 1 of the drawings may be modified, as shown in FIG. 4, to enable a combustible gas to be introduced into the supply conduit 2 for the oxidizing gas. The modification includes the addition of two or more tubes 34, the downstream end portions of which extend parallel with and close to the tube 33 and terminate a short distance upstream of the downstream end of the tube 33.

The tubes 34 pass through apertures in a plate 32 and, upstream of the plate, diverge from one another and from the tube 33 to communicate with a manifold 35 to which a combustible gas such as carbon monoxide can be fed through supply pipes 36.

The manner of operation of this modified form of apparatus is the same as that of the unmodified form except that the introduction of carbon monoxide into the supply conduit for the oxidizing gas causes additional heat to be released just before the oxidizing gas meets the titanium tetrachloride vapor. This raises the calculated mixed gas temperature and, as is explained herein, permits more accurate control and more rapid variation of the mixed gas temperature.

Figure 5:
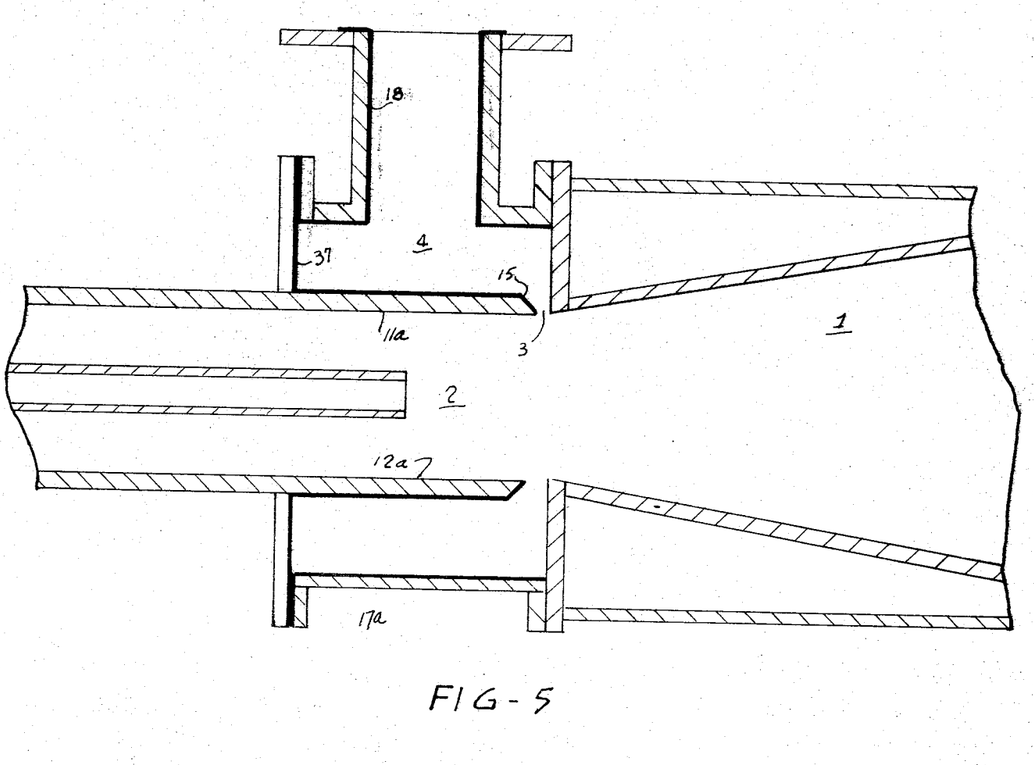
FIG. 5 is a cross-sectional view through a part of a second form of apparatus.

Referring to FIG. 5 of the drawing, the form of apparatus there shown is similar to that shown in FIG. 1 except that means is not provided for cooling the downstream portion 12 of the tubular member 11 nor for cooling the greater part of the surface of the annular distributing chamber 4 and the surface of the conduit 18. Rather, a platinum lining is provided for uncooled surfaces that are exposed to the pre-heated titanium tetrachloride vapor.

Thus, the downstream portion 12 of the member 11 is replaced by a portion 12a having only a single wall. The upstream face 15 of the passageway 3, the surface of the annular distributing chamber 4, except for the downstream end surface (which is cooled by the coolant that cools the surface of the reaction chamber 1) and the surface of the conduit 18 are provided with a platinum cladding 37. Also, the cylindrical member 17 (see FIG. 1) is replaced by a cylindrical member 17a which is of the same diameter throughout its length.

The manner of operation of this second form of apparatus is the same as that of the first form except that the reactants are subjected to a lesser degree of cooling which means that a given calculated mixed gas temperature is achieved with lower preheat temperatures.

Figure 6:
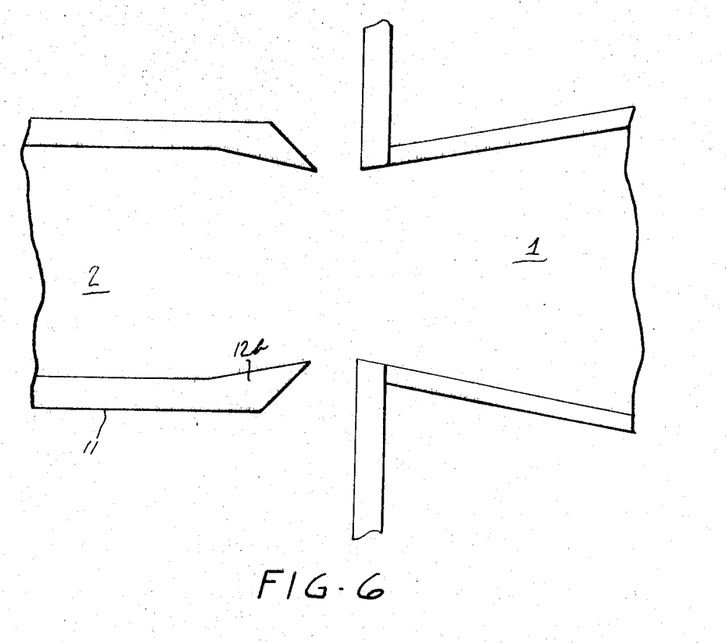
FIG. 6 is a cross-sectional view taken through the downstream end portion of a modified form of supply conduit for the oxidizing gas suitable for use in the forms of apparatus shown in FIGS. 1 and 5.

As shown in FIG. 6 of the drawing, the form of apparatus shown in FIG. 1 (whether or not modified in the manner shown in FIG. 5) can be provided with a tubular member 11 having a modified downstream portion 12b of which the end part tapers in a downstream direction. The resulting constriction in the supply conduit 2 for the oxidizing gas tends to increase the gas velocity near the terminus of the supply conduit. The diameter of the supply conduit 2 at its downstream end may be slightly less than the diameter of the reaction chamber 1 at its upstream end. In the form of apparatus shown in FIG. 5, the shape of the downstream portion 12a of the tubular manner 11a may be modified in a similar manner.

Figure 7:
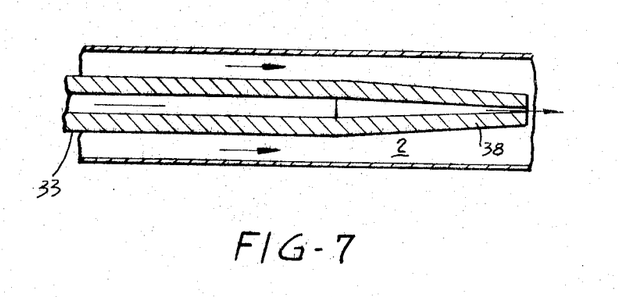
FIGS. 7 to 11 are cross-sectional views through modified nozzles and the like suitable for use in the forms of apparatus shown in FIGS. 1 and 5.
Figure 8:
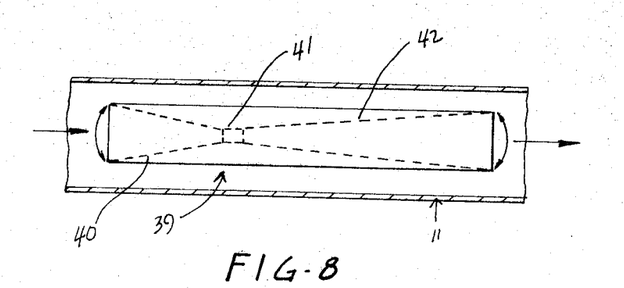

In the forms of apparatus shown in FIGS. 1 and 5, the downstream end portion of the tube 33 serves as a cylindrical nozzle for the gaseous suspension of the inert particulate material that is introduced through the tube 33. Other forms of nozzles may, however, be used instead. Thus, referring to FIG. 7, the downstream end portion of the tube 33 may be replaced by a convergent nozzle 38. Instead, as shown in FIG. 8, a venturi nozzle, indicated generally by reference numeral 39, may be used. It comprises an entrance cone 40, a throat 41 and an exit cone 42. The angle of the entrance cone 40 may vary within the range of from 20° to 30° and the angle of the exit cone 42 may vary within the range of from 7° to 12°. The length of the throat 41 may vary within the range of from ½ to 10 times the diameter of the throat.

Figure 9:
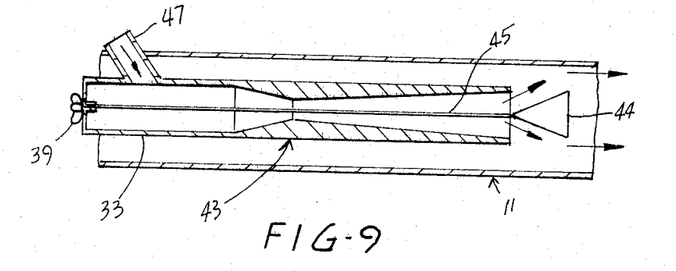

In the arrangement shown in FIG. 9, a venturi-type nozzle, indicated generally by the reference numeral 43, is provided with a pintle 44, which is a conical member mounted coaxially with the nozzle 43 in such manner that it tapers in an upstream direction. The apex of the pintle 44 is situated approximately in the plane of the downstream end of the nozzle 43, but the pintle 44 is located by a rod 45 which extends coaxially within the nozzle 43 and tube 33 to the upstream end of the tube 33 which, in this arrangement is closed, where there is provided adjusting means 39 to enable the position of the pintle 44 to be adjusted in an axial direction. Since the upstream end of the tube 33 is closed, there is provided a tube 47, which communicates with an inlet in the side wall of the tube 43, to enable the particulate material and its carrier gas to be introduced into the tube 33.

Another method of introducing the inert particulate refractory material is to dispense with the use of a nozzle mounted coaxially within the supply conduit for the oxidizing gas and arranged to spray the particulate material directly onto the wall surfaces adjacent to the inlet 3 and, instead, introduce the particulate material into the supply conduit for the oxidizing gas close to the upstream end of the conduit, for example, through two nozzles situated off the axis of the conduit, and then providing deflecting means in the downstream portion of the said supply conduit. Two such arrangements are shown in FIGS. 10 and 11, respectively.

Figure 10:
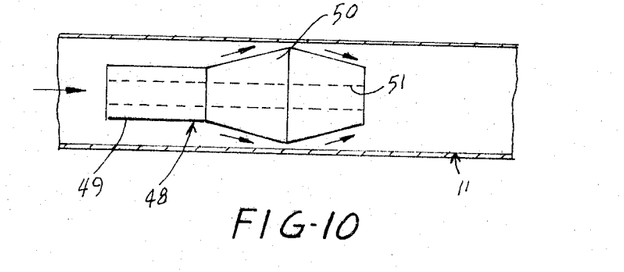

In the arrangement shown in FIG. 10, the deflecting means comprises a member which is indicated generally by the reference numeral 48. The upstream portion 49 of the member 48 is cylindrical, but the downstream end portion 50 of the member 48 first increases in diameter and then decreases in diameter in a downstream direction. Thus, the preheated oxidizing gas, the inert particulate material and any carrier gas flowing within the member 11 is confined to an annular region which is adjacent to the inner surface of the member 11 and of which the width first decreases and then increases again to give an effect similar to that of a venturi. If desired, the member 48 may be formed with a central bore 51, which can serve either as an inlet for the combustible gas or as a nozzle for the introduction of further particulate material.

Figure 11:
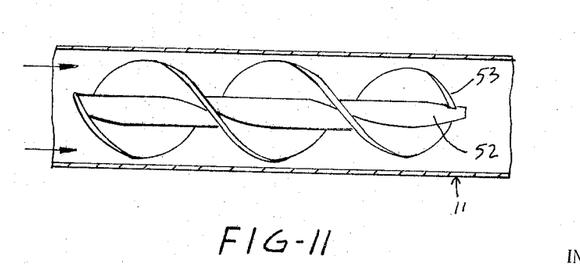

In the arrangement shown in FIG. 11, the deflecting means comprises a rod 52 mounted coaxially within the tubular member 11 and provided with helical vanes 53.

To illustrate the invention even more fully the following specific examples are set forth. Unless otherwise indicated all parts and percentages are by weight.

EXAMPLE I

Titanium dioxide was produced by the vapor-phase oxidation of titanium tetrachloride using apparatus as substantially shown in FIG. 1 of the drawing. The apparatus was constructed of a nickel alloy. The angle of the imaginary cone on which the inner surface of the frusto-conical member lies, was 4°30′. The length of the supply conduit 2 was ten times its diameter at its downstream end. The upstream and downstream faces of inlet 3 extended towards the axis of the reaction chamber 1 at angles of 75° and 90°, respectively, with respect to this axis. The separation, in an axial direction, of the downstream end of the tube 33 from the upstream face of the inlet 3 was such that silica sand issuing from said tube 33 impinged on the surfaces of the supply conduit 2 and reaction chamber 1 adjacent to inlet 3. The width of the mouth of the inlet 3 was 0.4 inch.

Liquid titanium tetrachloride containing dissolved aluminum chloride was vaporized and the resulting titanium tetrachloride vapor containing 2.0% aluminum chloride was preheated in a fused silica preheater. The preheated vapor was supplied to the conduit 18 at a constant rate of 75 parts of titanium tetrachloride per hour, the velocity of the vapor over the area of the mouth of the inlet 3 being approximately 200 feet per second.

Oxygen was preheated in a nickel alloy tube preheater and fed to the inlet 30 at a constant rate of 12.9 parts of oxygen per hour, water being metered to the oxygen stream, before it entered the preheater, by means of a positive displacement micro pump at a rate of 0.12 part of water per hour.

Preheated oxygen under pressure was supplied to the tube 33 at a rate of 1 part per hour. Preheated silica sand of mesh size —10 to +20 (B.S.S.) was introduced into the reactor through tube 33 at a rate of 7.5 parts per hour.

The velocity of the oxygen over the area of the downstream end of the supply conduit 2 was 185 feet per second.

The calculated mixed gas temperature (as hereinbefore defined) was about 920° C.

Cooling water was supplied to the cooling jackets to prevent corrosion thereof.

The titanium dioxide produced was separated from the gaseous reaction products and particulate material. A sample of the titanium dioxide thus produced was examined and found to have execellent pigmentary properties and to be wholly in the rutile form. The C.B.U. value was —2.2 units.

The process operated for a period of 107 hours without substantial build-up of product titanium dioxide on the walls of the apparatus.

EXAMPLE II

Titanium dioxide was produced by the vapor-phase oxidation of titanium tetrachloride using a form of apparatus similar to that used in Example I but modified in the manner shown in FIG. 4 of the drawings. The separation in an axial direction of the downstream end of the two tubes 34 from the downstream end of the tube 33 was one inch.

Liquid titanium tetrachloride containing dissolved aluminum chloride was vaporized and the resulting titanium tetrachloride vapor, containing 1.63% of aluminum chloride, was preheated in a fused silica preheater. It then was supplied to the conduit 18 at a constant rate of 75 parts of titanium tetrachloride per hour, the velocity of the gaseous mixture over the area of the mouth of the inlet 3 being 175 feet per second.

Oxygen preheated in a nickel alloy tube preheater, was fed to the inlet 30 at a constant rate of 13.61 parts of oxygen per hour, water being metered to the oxygen stream before entry into the preheater at a rate of 0.32 part per hour.

Preheated oxygen, under pressure, was supplied to the tube 33 at a rate of 1 part per hour. Preheated silica sand mesh sizes —10 to +20 (B.S.S.) was introduced through the tube 33 at a rate of 7.5 parts per hour.

The velocity of the oxygen over the area of the downstream end of the supply conduit 2 was 196 feet per second.

Preheated carbon monoxide was fed to the tubes 36 at a rate of 1.24 parts per hour. The total quantity of oxygen introduced into the reaction zone was sufficient to give complete combustion of the carbon monoxide.

But for the introduction of carbon monoxide, the calculated mixed gas temperature would have been 810° C. but the combustion of the carbon monoxide raised this to 930° C.

The titanium dioxide produced was separated from the gaseous reaction products and silica sand. A sample of the titanium dioxide produced was examined and found to have excellent pigmentary properties, to have a C.B.U. value of —4.3 and to be wholly in the rutile form.

The rate of supply of carbon monoxide to the apparatus then was reduced to 1.12 parts per hour and the rate of oxygen feed was reduced 0.07 part per hour. This reduced the velocity of the oxygen over the area of the downstream end of the supply conduit 2 to 194 feet per second.

The calculated reduction in the contribution of the carbon monoxide to the mixed gas temperature was 10° C. so that the calculated mixed gas temperature was reduced to 920° C. A sample of the product was taken after the temperature of the discharged cooling water indicated that thermal equilibrium had been attained. This required only 10 minutes after the reduction in the rate of feed of carbon monoxide. A sample of the titanium dioxide produced was examined and found to have excellent pigmentary properties, a C.B.U. value of —3.2 and to be wholly in the rutile form.

To demonstrate the flexibility of the above procedure as compared with the obvious expedient of reducing the preheat temperature of the titanium tetrachloride fed to the reactors, a comparable experiment was run in which the calculated mixed gas temperature was reduced 10° C. by reducing the preheat temperature of the titanium tetrachloride vapor. This procedure required a period of 1 hour and 20 minutes after the adjustment of the titanium tetrachloride preheater before thermal equilibrium was reached.

EXAMPLE III

Titanium dioxide was produced by the vapor-phase oxidation of titanium tetrachloride using a form of apparatus similar to that shown in FIG. 5 of the drawing. The apparatus was constructed of nickel alloy with platinum cladding of 99.9% pure platinum. The angle of the imaginary cone in which the inner surface of the frusto-conical member lies was 4°30'. The length of the supply conduit 2 was ten times its diameter at its downstream end.

The upstream face 15 of the inlet 3 extended in a downstream direction towards the axis of the reactor at an angle of 75° with respect to this axis. The downstream face extended toward the axis at an angle of 90° with respect to the axis. The termination, in an axial direction, of the downstream end of the tube 33 was such that inert particulate refractory material issuing from said tube 33 impinged on the reactor surfaces adjacent to said inlet 3. The width of the mouth of the inlet 3 was 0.4 inch.

Liquid titanium tetrachloride containing dissolved aluminum chloride was vaporized and the resulting titanium tetrachloride vapor, containing 2.0% aluminum chloride, was preheated in a fused silica preheater. The preheated vapor mixture was supplied to the conduit 18 at a constant rate of 75 parts of titanium tetrachloride per hour, the velocity of this gaseous mixture over the area of the mouth of the inlet 3 being approximately 180 feet per second.

Oxygen was preheated in a nickel-alloy tube preheater and supplied to the pipe 30 at a constant rate of 12.9 parts of oxygen per hour, water being metered to the oxygen stream before entry into the preheater at a rate of 0.26 part per hour.

Preheated oxygen, under pressure, was supplied to the tube 33 at a rate of 1 part per hour. Preheated silica sand of mesh sizes —10 to +20 (B.S.S.) was introduced through the tube 33 at a rate of 7.5 parts per hour.

The velocity of the oxygen over the downstream end of the supply conduit 2 was about 173 feet per second.

The calculated mixed temperature was 920° C.

Cooling water was supplied to the cooling jacket to prevent corrosion of metal parts.

A sample of the titanium dioxide produced was separated from sand and gaseous reaction products and was found to have excellent pigmentary properties, to be wholly in the rutile form and to have a C.B.U. value of —2.7 units.

There was no apparent corrosion of the burner surfaces and the fused silica preheater tubes showed no signs of devitrification after 2 months of continuous use.

This example illustrates that the use of platinum clad burner surfaces obviates completely the need for resorting to cooling means to prevent undesired corrosion of metal parts upstream of the reactor. In addition, it shows that the elimination of cooling also allows for the use of lower titanium tetrachloride preheat temperatures which results in a longer, useful life of the preheaters.

Thus, it was calculated that if the platinum lining 37 had not been used and the surfaces concerned had been cooled sufficiently to avoid corrosion of the nickel alloy, the temperature to which the titanium tetrachloride would have had to be preheated in order to give the same calculated mixed gas temperature would have had to be of the order of 100° higher than the temperature that was actually used, assuming that the temperature to which the oxygen was preheated remained the same.

While the invention has been described with respect to what at present are preferred embodiments thereof, it will be understood, of course, that certain changes, substitutions, modifications and the like may be made therein without departing from its true scope as defined in the appended claims.

What is claimed is:

1. In an apparatus adapted for use in the vapor-phase oxidation of titanium tetrachloride having an elongated titanium dioxide-forming reaction zone provided with means for the introduction of preheated oxiding gas, inlet means for the introduction of preheated titanium tetrachloride, and an entrance portion, said means for the introduction of said oxidizing gas comprising a supply conduit, the downstream end of which is spaced from the entrance portion of said reaction zone to define a circumferentially extending inlet which comprises said inlet means for the preheated titanium tetrachloride, the improvements which comprise:

providing said inlet means with an upstream face extending towards the axis of said conduit and reaction zone at an angle within the range of from about 15° to 165° with respect to said axis and a downstream face extending towards said axis at an angle within the range of about 15° to 165° with respect to said axis, provided that when said upstream and downstream faces extend toward the axis of the reaction zone at an angle greater than 80° with respect to said axis the supply conduit for the oxidizing gas terminates in a tapered section, and said supply conduit having a diameter at its downstream end no greater than the diameter of the entrance portion of said reaction zone and the downstream end portion of said conduit over a length equal to at least five times the diameter of its downstream end having a straight axis, being coaxial with the reaction zone and being substantially non-divergent in the direction of flow of the oxidizing gas.

2. Apparatus as defined in claim 1 in which said upstream face and said downstream face of said inlet means for the titanium tetrachloride extend towards said axis at the same angle and said supply conduit for the oxidizing gas terminates in a tapered section.

3. Apparatus as defined in claim 1 in which the downstream face of said inlet means extends towards said axis at an angle within the range of from about 25° to 90° with respect to said axis.

4. Apparatus as set forth in claim 1 in which said reaction zone has an entrance portion tapering in an upstream direction at an angle of from about 1° to 30° and a length equal to about 1 to 25 times its diameter at its entrance end.

5. Apparatus as set forth in claim 1 in which said inlet means for the titanium tetrachloride is provided with a distributing chamber disposed about said inlet.

6. Apparatus as set forth in claim 1 in which the supply conduit for the oxidizing gas is provided with an annular distributing chamber disposed in operative communication therewith through a circumferentially extending opening.

7. Apparatus as set forth in claim 1 in which means is provided for introducing a combustible gas into the downstream end portion of the supply conduit for the oxidizing gas.

8. Apparatus as set forth in claim 1 in which means is provided for cooling the surface of the reaction zone downstream of said inlet means for the titanium tetrachloride.

9. Apparatus as set forth in claim 1 in which said inlet means for the titanium tetrachloride is provided with a distributing chamber disposed thereabout, at least a part of the inner surface of said chamber and said inlet means being formed of a corrosion-resistant metal selected from the group consisting of platinum and alloys thereof.

10. Apparatus as set forth in claim 1 provided with venturi nozzle means mounted coaxially within said supply conduit and adapted to deliver inert particulate refractory material upon those surfaces of the reaction zone and the oxygen supply conduit that are adjacent to said inlet means for the titanium tetrachloride.

11. Apparatus as set forth in claim 1 in which nozzle means is provided for introducing inert particulate material into the upstream end of said supply conduit for the oxidizing gas and deflecting means is provided within said conduit and arranged to deflect said particulate material towards the surface of said conduit.

12. In an apparatus adapted for use in the vapor-phase oxidation of titanium tetrachloride having an elongated titanium dioxide-forming reaction zone provided with means for the introduction of preheated oxidizing gas, inlet means for the introduction of preheated titanium tetrachloride, and an entrance portion, said means for the introduction of said oxidizing gas comprising a supply conduit, the downstream end of which is spaced from the entrance of said reaction zone to define a circumferentially extending inlet which comprises said inlet means for the preheated titanium tetrachloride, the improvements which comprise:

providing said inlet means with an upstream face which extends towards the axis of the reaction zone at an angle within the range of from about 15° to 165° with respect to said axis and a downstream face extending towards said axis in a manner such that the faces converge with one another towards the axis of said reaction zone and the supply conduit for the oxidizing gas terminates in a tapered section, and said supply conduit has a diameter at its downstream end no greater than the diameter of the entrance portion of said reaction zone and the downstream end portion of said conduit over a length equal to at least five times the diameter of its downstream end having a straight axis, being coaxial with the reaction zone and being substantially non-divergent in the direction of flow of the oxidizing gas.

13. In an apparatus adapted for use in the vapor-phase oxidation of titanium tetrachloride having an elongated titanium dioxide-forming reaction zone provided with means for the introduction of preheated oxidizing gas, inlet means for the introduction of preheated titanium tetrachloride, and an entrance portion, said means for the introduction of said oxidizing gas comprising a supply conduit, the downstream end of which is spaced from the entrance portion of said reaction zone to define a circumferentially extending inlet which comprises said inlet means for the preheated titanium tetrachloride, the improvements which comprise:

providing said inlet means with an upstream face extending in a downstream direction toward the axis of the reaction zone at an angle within the range of from about 15° to 80° with respect to said axis and a downstream face extending towards the axis of the reaction zone in such manner that the angle between it and normal to the axis is at least 10° less than the angle between the upstream face and the normal to said axis, and said supply conduit has a diameter at its downstream end no greater than the diameter of the entrance portion of said reaction zone and the downstream end portion of said conduit over a length equal to at least five times the diameter of its downstream end having a straight axis, being coaxial with the reaction zone and being substantially non-divergent in the direction of flow of the oxidizing gas.

14. In an apparatus adapted for use in the vapor-phase oxidation of titanium tetrachloride having an elongated titanium dioxide-forming reaction zone provided with means for the introduction of preheated oxidizing gas, inlet means for the introduction of preheated titanium tetrachloride, and an entrance portion, said means for the introduction of said oxidizing gas comprising a supply conduit, the downstream end of which is spaced from the entrance portion of said reaction zone to define a circumferentially extending inlet which comprises said inlet means for the preheated titanium tetrachloride, the improvements which comprise:

providing said inlet means with an upstream face extending towards the axis of said conduit and reaction zone at an angle within the range of from about 15° to 165° with respect to said axis and a downstream face extending towards said axis at an angle within the range of about 15° to 165° with respect to said axis, provided that when said upstream and downstream faces extend toward the axis of the reaction zone at an angle greater than 80° with respect to said axis the supply conduit for the oxidizing gas terminates in a tapered section, and said supply conduit has a diameter at its downstream end no greater than the diameter of the entrance portion of said reaction zone and the downstream end portion of said conduit over a length equal to at least five times the diameter of its downstream end having a straight axis, being coaxial with the reaction zone and being substantially non-divergent in the direction of flow of the oxidizing gas, said apparatus being provided with a venturi nozzle adapted to direct inert particulate refractory material upon the surfaces of the reaction zone and the oxygen supply conduit that are adjacent to said inlet means for the titanium tetrachloride, said nozzle being provided with a movable coaxial conical member spacially mounted downstream from the mouth of the venturi and adapted to deflect the particulate material outwardly.

References Cited

UNITED STATES PATENTS

| | | | |
|---|---|---|---|
| 2,838,585 | 6/1958 | Lehrer | 23—277 XR |
| 3,247,890 | 4/1966 | Williams | 23—277 XR |
| 3,322,499 | 5/1967 | Carpenter | 23—1 XR |
| 3,297,411 | 1/1967 | Dear | 23—202 XR |
| 2,915,367 | 12/1959 | Olson et al. | 23—202 |
| 3,085,865 | 4/1963 | Long et al. | 23—277 |

JAMES H. TAYMAN, JR., Primary Examiner

U.S. Cl. X.R.

23—1, 140, 182, 202, 284; 110—104; 131—187